United States Patent
Farmer

(10) Patent No.: US 9,249,939 B2
(45) Date of Patent: Feb. 2, 2016

(54) GRADIENT OPTICS FOR EVEN LIGHT DISTRIBUTION OF LED LIGHT SOURCES

(71) Applicant: BRIDGELUX, INC., Livermore, CA (US)

(72) Inventor: Todd Farmer, Livermore, CA (US)

(73) Assignee: Bridgelux, Inc., Livermore, CA (US)

( * ) Notice: Subject to any disclaimer, the term of this patent is extended or adjusted under 35 U.S.C. 154(b) by 134 days.

(21) Appl. No.: 14/219,922

(22) Filed: Mar. 19, 2014

(65) Prior Publication Data

US 2014/0201978 A1   Jul. 24, 2014

Related U.S. Application Data

(63) Continuation of application No. 13/292,033, filed on Nov. 8, 2011, now Pat. No. 8,690,382.

(60) Provisional application No. 61/427,740, filed on Dec. 28, 2010.

(51) Int. Cl.
| | |
|---|---|
| *F21V 3/00* | (2015.01) |
| *F21K 99/00* | (2010.01) |
| *F21V 5/00* | (2015.01) |
| *F21V 13/04* | (2006.01) |
| *G02B 5/02* | (2006.01) |
| *G02B 5/20* | (2006.01) |
| *F21Y 101/02* | (2006.01) |
| *G02B 3/00* | (2006.01) |

(52) U.S. Cl.
CPC ... *F21K 9/50* (2013.01); *F21V 5/00* (2013.01); *F21V 13/04* (2013.01); *G02B 5/021* (2013.01); *G02B 5/205* (2013.01); *F21Y 2101/02* (2013.01); *G02B 3/0087* (2013.01); *Y10T 29/49002* (2015.01)

(58) Field of Classification Search
CPC ............ F21K 9/50; F21V 5/00; F21V 13/04; F21Y 2101/02; G02B 3/0087; G02B 5/021; G02B 5/205; Y10T 29/49002
See application file for complete search history.

(56) References Cited

U.S. PATENT DOCUMENTS

| | | |
|---|---|---|
| 5,847,803 A | 12/1998 | Gupta et al. |
| 5,907,386 A | 5/1999 | Gupta et al. |
| 6,850,095 B2 | 2/2005 | Sayers et al. |
| 7,682,034 B2 | 3/2010 | Asvadi et al. |
| 8,068,288 B1 | 11/2011 | Pitou |
| 8,231,250 B2 | 7/2012 | Bailey |

(Continued)

OTHER PUBLICATIONS

Office Action for U.S. Appl. No. 13/191,117 issued by the USPTO Mar. 28, 2013.

(Continued)

*Primary Examiner* — Stephen F Husar
(74) *Attorney, Agent, or Firm* — Arent Fox LLP

(57) ABSTRACT

Gradient optics for even light distribution of LED light sources. In an aspect, an apparatus is provided for uniform distribution of light emitted from a light source. The apparatus includes a panel coupled to receive the light emitted from the light source, and gradient optics disposed on the panel, the gradient optics providing a matching transparency gradient that is aligned with the light source to evenly distribute the emitted light. In another aspect, an apparatus includes means for receiving the light emitted from the light source, and means for providing a matching transparency gradient that is aligned with the light source to evenly distribute the emitted light.

12 Claims, 4 Drawing Sheets

(56) References Cited

U.S. PATENT DOCUMENTS

| | | | |
|---|---|---|---|
| 8,690,382 B2* | 4/2014 | Farmer | F21V 5/00 362/223 |
| 2011/0051394 A1 | 3/2011 | Bailey | |
| 2011/0199352 A1* | 8/2011 | Wheatley | G02B 6/0035 345/207 |
| 2012/0140461 A1 | 6/2012 | Pickard | |
| 2012/0147597 A1 | 6/2012 | Farmer | |
| 2012/0162978 A1 | 6/2012 | Farmer | |

OTHER PUBLICATIONS

Office Action for U.S. Appl. No. 13/191,117 issued by the USPTO Sep. 16, 2013.

Office Action for U.S. Appl. No. 13/292,033 issued by the USPTO Jan. 10, 2013.

Office Action for U.S. Appl. No. 13/292,033 issued by the USPTO Jul. 8, 2013.

* cited by examiner

GRADIENT OPTICS FOR EVEN LIGHT DISTRIBUTION OF LED LIGHT SOURCES

CROSS-REFERENCE TO RELATED APPLICATION

This Application claims priority to U.S. patent application Ser. No. 13/292,033, filed Nov. 8, 2011 now U.S. Pat. No. 8,690,382, which claimed priority to U.S. Provisional Patent Application Ser. No. 61/427,740, filed Dec. 28, 2010, the contents of both of which are hereby incorporated by reference their entireties.

BACKGROUND

1. Field

The present application relates generally to light emitting diodes, and more particularly, to gradient optics for even light distribution of LED light sources.

A light emitting diode comprises a semiconductor material impregnated, or doped, with impurities. These impurities add "electrons" and "holes" to the semiconductor, which can move in the material relatively freely. Depending on the kind of impurity, a doped region of the semiconductor can have predominantly electrons or holes, and is referred to as an n-type or p-type semiconductor region, respectively.

In LED applications, an LED semiconductor chip includes an n-type semiconductor region and a p-type semiconductor region. A reverse electric field is created at the junction between the two regions, which causes the electrons and holes to move away from the junction to form an active region. When a forward voltage sufficient to overcome the reverse electric field is applied across the p-n junction, electrons and holes are forced into the active region and combine. When electrons combine with holes, they fall to lower energy levels and release energy in the form of light. The ability of LED semiconductors to emit light has allowed these semiconductors to be used in a variety of lighting devices. For example, LED semiconductors may be used in general lighting devices for interior or exterior applications.

A troffer is a light fixture resembling an inverted trough that is either recessed in, or suspended from, the ceiling. Troffers are typically designed to emit light using fluorescent lighting tubes. The fluorescent tubes emit light along the entire length of the troffer to produce a desirable light distribution pattern. Unfortunately, fluorescent lighting tubes may be expensive, require a warm up period, and produce flicker that people may find undesirable. Thus, LEDs are attractive candidates for replacing fluorescent lighting tubes in troffers. For example, LEDs have no warm up time, are long lasting and power efficient, and do not flicker. However, LEDs are considered to be a point light source in that the light is emitted from a relatively small region. Thus, utilizing LEDs in troffers present various design challenges since it is desirable to have uniformly distributed light across the length of the Troffer. One technique for using LEDs to obtain uniformly distributed light across the length of the Troffer is to use a large number of LEDs that are distributed throughout the troffer. Unfortunately, this technique results in a complex troffer design and the cost of utilizing a large number of LEDs may be prohibitive.

Accordingly, what is needed is a simple and cost efficient way to provide even light distribution for point light sources thereby facilitating the use of LED semiconductors in troffer devices.

SUMMARY

In various aspects, a distribution panel is provided that operates to produce uniformly distributed light from various light sources. For example, the distribution panel is suitable for use in a troffer device to provide even distribution of light emitted from LED semiconductors. The distribution panel comprises gradient optics providing a matching transparency gradient that is matched to a light source to uniformly distribute the emitted light. As a result, the distribution panel can distribute the light from a few LED devices or a fluorescent tube across an entire troffer. Thus, the distribution panel with matching transparency gradient provides a simple and cost efficient way to utilize LED semiconductors in a troffer to produce uniformly distributed light.

In one implementation, an apparatus is provided for uniform distribution of light emitted from a light source. The apparatus comprises a panel coupled to receive the light emitted from the light source, and gradient optics disposed on the panel, the gradient optics providing a matching transparency gradient that is aligned with the light source to evenly distribute the emitted light.

In another implementation, an apparatus is provided for uniform distribution of light emitted from a light source. The apparatus comprises means for receiving the light emitted from the light source, and means for providing a matching transparency gradient that is aligned with the light source to evenly distribute the emitted light.

It is understood that other aspects of the present invention will become readily apparent to those skilled in the art from the following detailed description. As will be realized, the present invention includes other and different aspects and its several details are capable of modification in various other respects, all without departing from the spirit and scope of the present invention. Accordingly, the drawings and the detailed description are to be regarded as illustrative in nature and not as restrictive.

BRIEF DESCRIPTION OF THE DRAWINGS

The foregoing aspects described herein will become more readily apparent by reference to the following Description when taken in conjunction with the accompanying drawings wherein:

FIG. 3 shows various implementations of the distribution panel shown in

FIG. 2 constructed in accordance with the present invention;

DESCRIPTION

Figure 1:
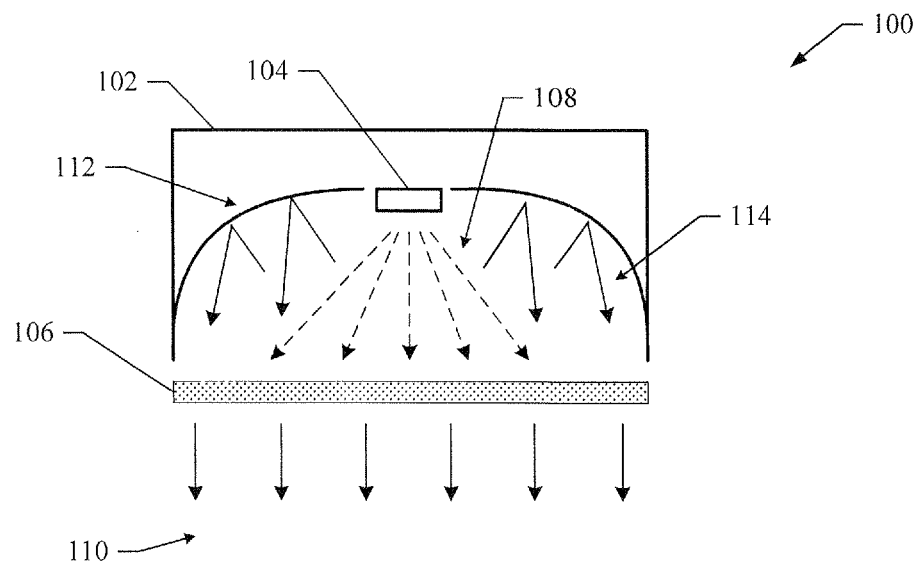
FIG. 1 shows an exemplary apparatus that illustrates the operation of a distribution panel with matching transparency gradient to provide even light distribution.

The present invention is described more fully hereinafter with reference to the accompanying drawings, in which various aspects of the present invention are shown. This invention may, however, be embodied in many different forms and should not be construed as limited to the various aspects of the present invention presented throughout this disclosure. Rather, these aspects are provided so that this disclosure will be thorough and complete, and will fully convey the scope of the present invention to those skilled in the art. The various aspects of the present invention illustrated in the drawings may not be drawn to scale. Accordingly, the dimensions of the various features may be expanded or reduced for clarity. In addition, some of the drawings may be simplified for clarity. Thus, the drawings may not depict all of the components of a given apparatus (e.g., device) or method.

Various aspects of the present invention will be described herein with reference to drawings that are schematic illustrations of idealized configurations of the present invention. As such, variations from the shapes of the illustrations as a result, for example, manufacturing techniques and/or tolerances, are to be expected. Thus, the various aspects of the present invention presented throughout this disclosure should not be construed as limited to the particular shapes of elements (e.g., regions, layers, sections, substrates, etc.) illustrated and described herein but are to include deviations in shapes that result, for example, from manufacturing. By way of example, an element illustrated or described as a rectangle may have rounded or curved features and/or a gradient concentration at its edges rather than a discrete change from one element to another. Thus, the elements illustrated in the drawings are schematic in nature and their shapes may not be intended to illustrate the precise shape of an element and are not intended to limit the scope of the present invention.

It will be understood that when an element such as a region, layer, section, substrate, or the like, is referred to as being "on" another element, it can be directly on the other element or intervening elements may also be present. In contrast, when an element is referred to as being "directly on" another element, there are no intervening elements present. It will be further understood that when an element is referred to as being "formed" on another element, it can be grown, deposited, etched, attached, connected, coupled, or otherwise prepared or fabricated on the other element or an intervening element.

Furthermore, relative terms, such as "lower" or "bottom" and "upper" or "top," may be used herein to describe one element's relationship to another element as illustrated in the drawings. It will be understood that relative terms are intended to encompass different orientations of an apparatus in addition to the orientation depicted in the Drawings. By way of example, if an apparatus in the Drawings is turned over, elements described as being on the "lower" side of other elements would then be oriented on the "upper" sides of the other elements. The term "lower", can therefore, encompass both an orientation of "lower" and "upper," depending of the particular orientation of the apparatus. Similarly, if an apparatus in the drawing is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items It will be understood that although the terms "first" and "second" may be used herein to describe various regions, layers and/or sections, these regions, layers and/or sections should not be limited by these terms. These terms are only used to distinguish one region, layer or section from another region, layer or section. Thus, a first region, layer or section discussed below could be termed a second region, layer or section, and similarly, a second region, layer or section may be termed a first region, layer or section without departing from the teachings of the present invention.

FIG. 1 shows an exemplary apparatus 100 that illustrates the operation of a distribution panel with matching transparency gradient to provide even light distribution. The apparatus 100 comprises a housing 102, LED light source 104 and distribution panel 106 with matching transparency gradient.

During operation, light emitted from the LED 104 strikes the distribution panel 106 and the matching transparency gradient distributes the light to produce even light distribution, shown generally at 110.

The panel 106 is designed to have a matching transparency gradient that is orientated and/or aligns or matches the location of the LED 104. For example, the panel 106 provides less transparency at a center line location directly below the LED 104 and increasing transparency corresponding to increasing distances from the center line. Thus, more light passes through the panel 106 at positions located radially outward from the center line. As a result, even light distribution as shown at 110 can be achieved. A more detailed description of the distribution panel 106 is provided below.

To enhance the light distribution properties of the distribution panel 106, the housing 102 comprises reflective surfaces, shown generally at 112. The reflective surfaces 112 operate to reflect light back through the distribution panel to enhance its light distribution properties. For example, direct light 108 strikes the distribution panel and some of this direct light is reflected. This light then travels back up to the reflective surfaces 112 where is it reflected back through the distribution panel 106. The light rays shown generally at 114 illustrate the path of the reflected light. Therefore, the apparatus 100 illustrates the operation of the distribution panel 106 to provide even light distribution from an LED light source.

Figure 2:
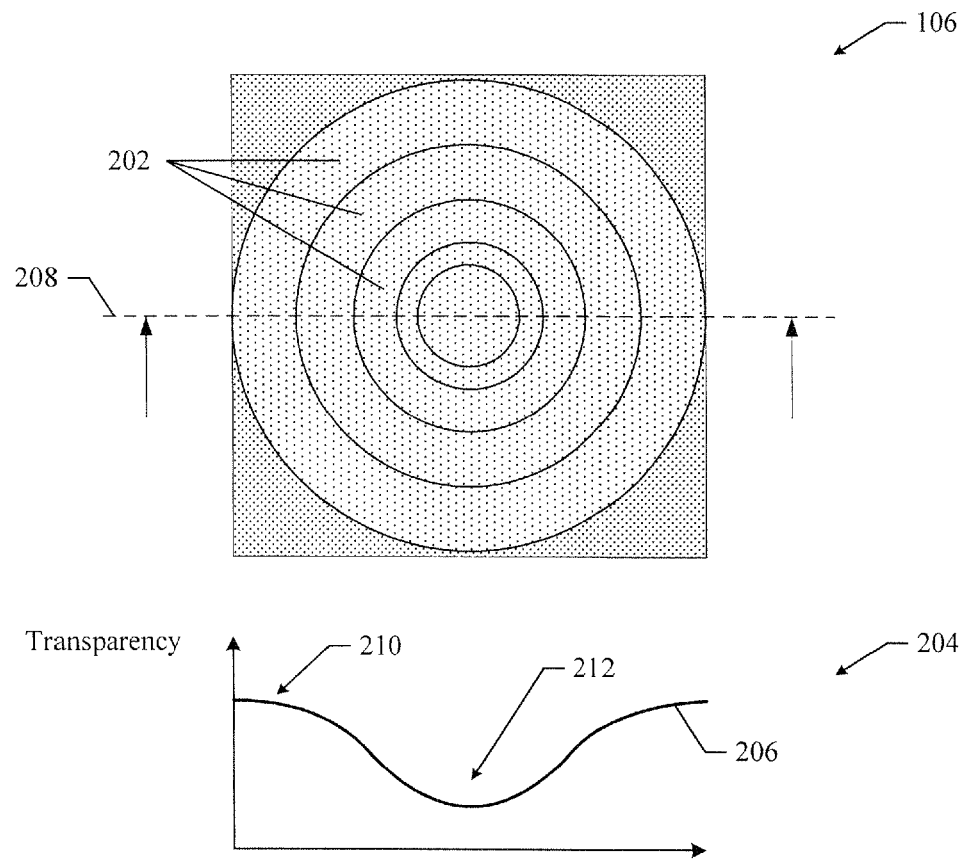
FIG. 2 shows a detailed top view of the distribution panel shown in the apparatus of FIG. 1.

FIG. 2 shows a detailed top view of the distribution panel 106 shown in FIG. 1. The distribution panel 106 provides a transparency gradient to enable even distribution of light from a point source. In one embodiment, the distribution panel 106 is made from an acrylic or plastic material having concentric circles 202 that vary the material density with the radial distance between the circles increasing as the radial distance from a point directly below the LED 104 increases. The varying material densities of the concentric circles 202 provide different transparency characteristics so that a transparency gradient is formed such that greater transparency is provided at the outer circles than the inner circles. For example, thicker material allows less light to pass through. Thus, tightly packed rings make the material denser in the center and less dense at edges.

A graph 204 illustrates the transparency gradient provided by the distribution panel 106. The graph 204 comprises a plot line 206 representing the transparency of the distribution panel 106 at any location on the indicator line 208. As shown in the graph 204, more transparency is provided at the outer circles indicated at 210 and less transparency is provided at the inner circles as indicated at 212.

Figure 3:
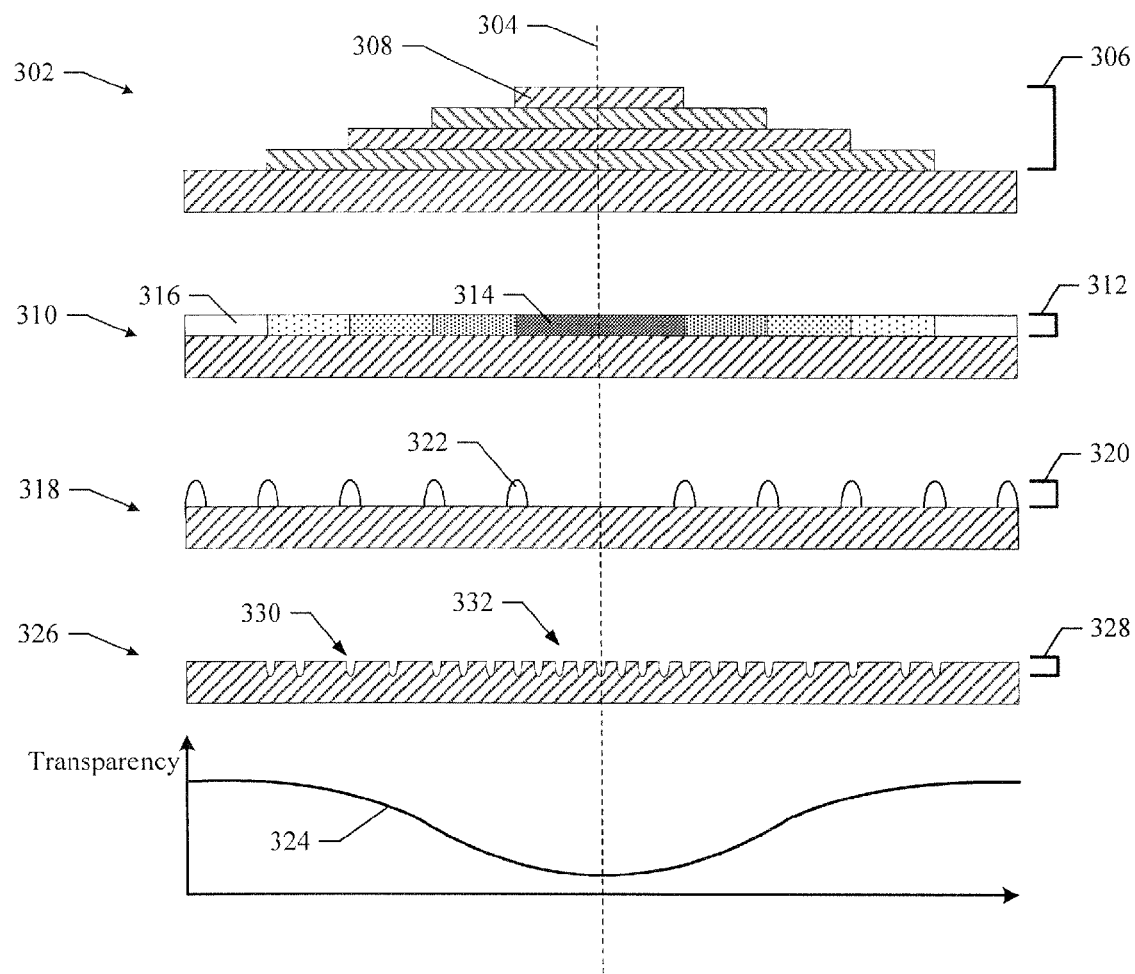

FIG. 3 shows cross sectional views of various implementations of the distribution panel 106 constructed in accordance with the present invention. For example, the cross sectional views are taken at cross section indicator 208 shown in FIG. 2. Each implementation comprises a panel with gradient optics disposed thereon.

In a first implementation 302, the distribution panel 106 comprises a piece of acrylic and the gradient optics 306 comprise concentric circles (illustrated at 308) of varying diameter whose centers are aligned and located on center line 304. When in use, the center line 304 also aligns with the LED semiconductor whose emitted light is being distributed by the distribution panel 106. The concentric circles of material may have the same or different thicknesses. Thus, the thickness of the panel 106 decreases with increasing distance from the center line 304. The increasing thickness provides the transparency gradient illustrated at 324. It should be noted that the gradient optics 306 are not limited to circles or any particular geometric shape. Furthermore, although shown as increasing the material thickness of the panel, the gradient optics 306 may comprise material of varying densities which do not change the material thickness but accomplish the same result.

In a second implementation 310, the distribution panel 106 comprises a piece of acrylic and the gradient optics 312 comprise a surface coating that provides the transparency gradient. The surface coating may be formed using a variety of techniques. For example, the surface coating may be a diffuser film applied to the acrylic or a polymer material that is painted onto the acrylic. The surface coating is designed to provide less transparency near the center line 304, as illustrated by the dark region 314, and more transparency as the distance from the center line increases, as illustrated at the light region 316. The different transparency regions of the surface coating provide the transparency gradient illustrated at 324.

In a third implementation 318, the distribution panel 106 comprises a piece of acrylic and the gradient optics 320 comprise surface texturing that provides one or more surface features 322. The surface features 322 may be ridges, bumps or other surface features that are arranges in any desired pattern and/or spacing to provide the transparency gradient illustrated at 324. For example, in one implementation, the surface texturing comprises rings of ribs that gradually increase in diameter from the center line 304.

In a fourth implementation 326, the distribution panel 106 comprises a piece of acrylic and the gradient optics 328 comprise surface texturing that provides one or more surface defects, as illustrated at 330. The surface defects 330 comprise scratched or sanded regions or other defects in the acrylic panel which affect light distribution. The surface defects are arranged in any desired pattern and/or spacing to provide the transparency gradient illustrated at 324. For example, more surface defects are shown toward the center line 304, as illustrated at 332, to reduce transparency. Less surface defects are provided as the distance from the center line 304 increases to increase transparency.

Therefore, the various implementations of the distribution panel 106 provide a transparency gradient that evenly distributes light from a light source. It should be noted that although four types of gradient optics are shown, any suitable type of technique or optical mechanism may be used to provide gradient optics allowing the transparency gradient 324 to be produced. It should also be noted that the various gradient optic may be used individually or combined in any combination or fashion to produce the transparency gradient 324.

Figure 4:
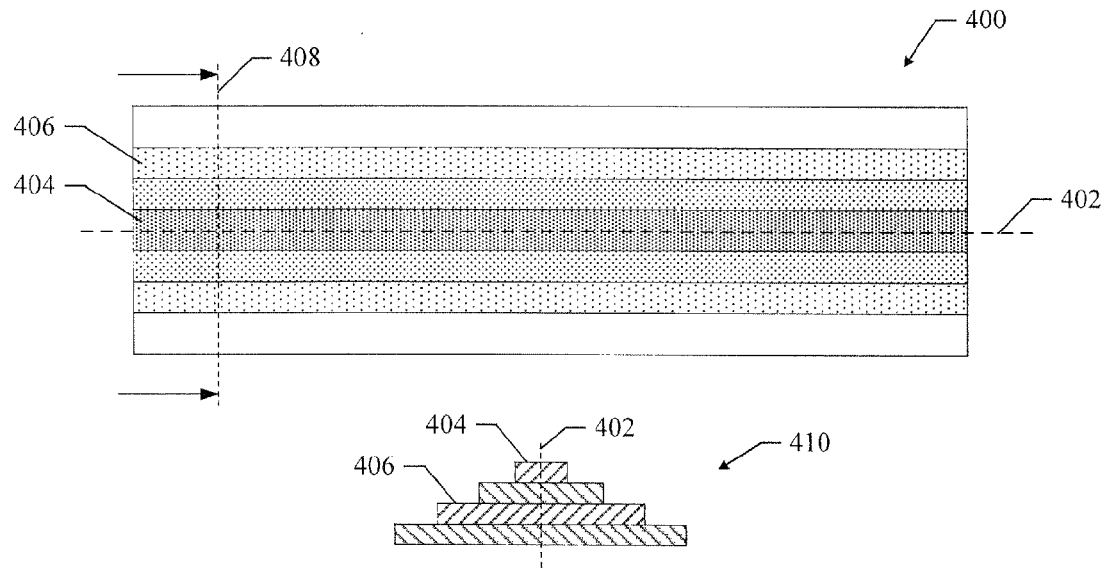
FIG. 4 shows a distribution panel with matching transparency gradient to evenly distribute light in a troffer device that includes a fluorescent tube.

FIG. 4 shows a distribution panel 400 with matching transparency gradient configured to evenly distribute light in a troffer device that includes a fluorescent tube. The distribution panel 400 comprises gradient optics that provide a transparency gradient aligned along center line 402, which matches a center line along the length of the fluorescent tube. For example, the gradient optics comprise less transparency at location 404 and increased transparency as the distance from the center line 402 increases, for instance, at location 406.

Also shown in FIG. 4 is end view 410 of the distribution panel 400. For example, the end view 410 is taken at cross section indicator 408. The end view 410 illustrates how the gradient optics provide thicker material for less transparency at location 404, and less material to provide greater transparency at location 406.

Thus, the distribution panel 400 provides a matching transparency gradient configured to evenly distribute light in a troffer device that includes a fluorescent tube.

Figure 5:
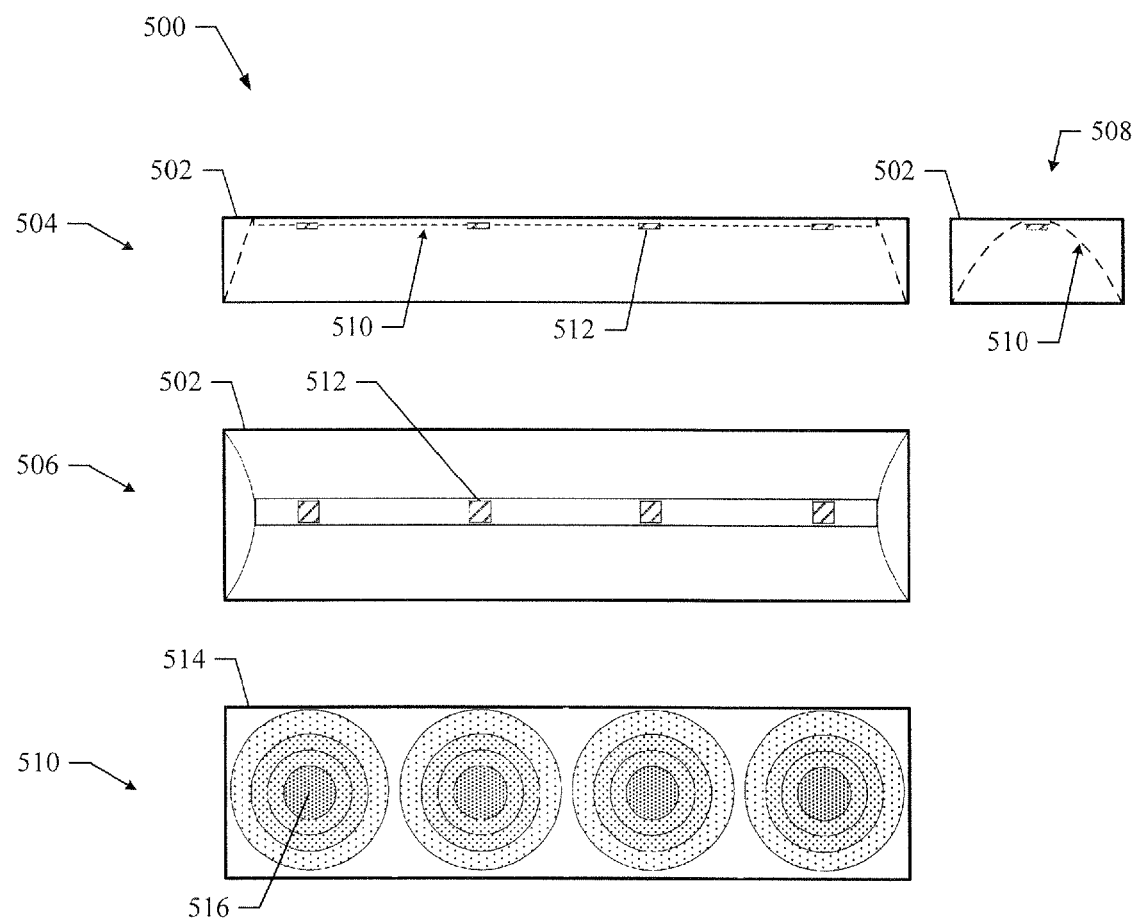
FIG. 5 shows a distribution panel with matching transparency gradients to evenly distribute light in a troffer device that includes four LED semiconductors.

FIG. 5 shows a distribution panel with matching transparency gradient to evenly distribute light in a troffer device that includes four LED semiconductors. A troffer 500 comprises a housing 502 that is illustrated in side 504, bottom 506 and end 508 views. For example, the housing may be a 2'×4' housing typically used for fluorescent lighting.

Referring to the side view 504, the housing 502 comprises an internal reflective surface 510 which is designed to reflected light to the bottom portion of the housing. Referring to the end view 508, the reflective surface 510 is more clearly shown.

Referring now to the bottom view 506, the housing 502 comprises four LED semiconductor devices 512 mounted therein. The LEDs 512 are spaced along the length of the housing 502 and are configured to emit light toward the bottom of the housing 502.

The troffer 500 also comprises a distribution panel 514 which is shown in the bottom view 510. The distribution panel 514 comprises four transparency gradients 516 that are matched to align with each of the LEDs 512. When assembled to the housing 502, the distribution panel 514 operates to evenly distribute light emitted from the LEDs 512.

It is also possible that additional LEDs (or LED arrays) each associated with their own transparency gradient on the distribution panel 514 be added to the housing 502 to better spread out the light over larger areas. By way of example, the troffer 500 may be divided into any number of regions with an LED (or LED array) mounted at the center of each region and having a distribution panel with matching transparency gradient associated with each LED.

Figure 6:
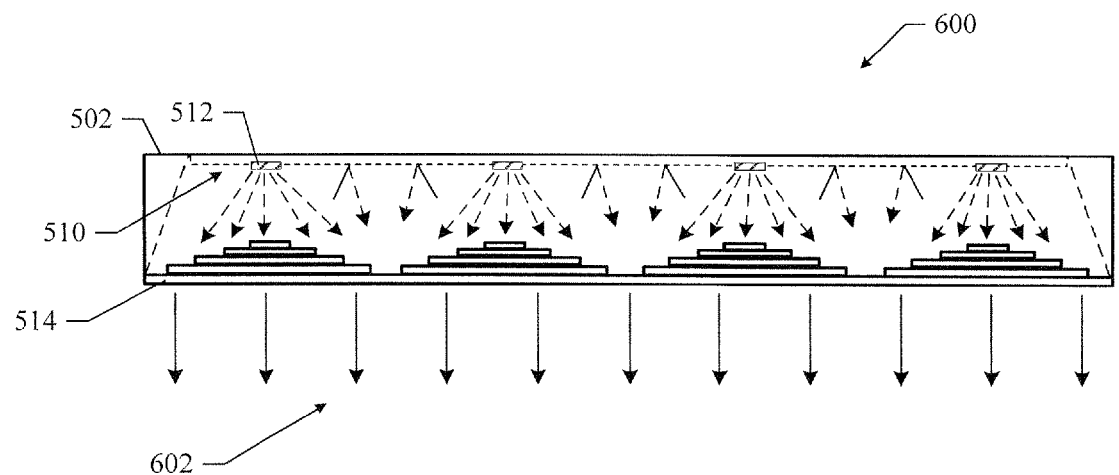
FIG. 6 shows the components illustrated in FIG. 5 in a completed LED troffer assembly.

FIG. 6 shows the components illustrated in FIG. 3 in a completed troffer assembly 600. For example, the troffer assembly 600 is suitable for use as an internal lighting device, such as a ceiling light. In the troffer assembly 600, the distribution panel 514 is mounted to the bottom portion of the housing 502. It should be noted that the distribution panel 514 provides a matching transparency gradient for each LED by utilizing concentric circles of material to increase transparency as the distance from a center line through each LED increases.

During operation, each of the LEDs 512 emit light that passes through their associated matched transparency gradients provided by the distribution panel 514 to produce evenly distributed light illustrated at 602.

Light from the LEDs 512 also reflects off the reflective surface 510 to enhance the light distribution effects of the distribution panel 514. Thus, the troffer assembly 600 operates to provide evenly distributed light from an LED light source that overcomes the problems associate with convention fluorescent lighting.

Figure 7:
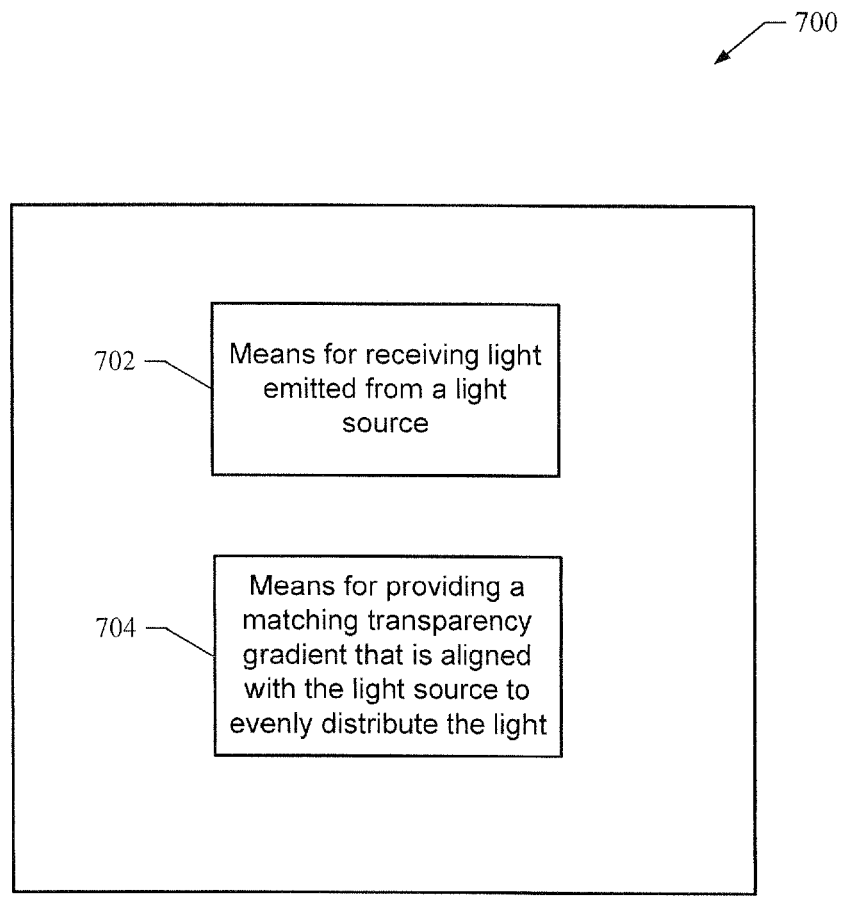
FIG. 7 shows an exemplary distribution apparatus with matching transparency gradient.

FIG. 7 shows an exemplary distribution apparatus 700 with matching transparency gradient. For example, the apparatus 700 is suitable for use as the distribution panel 106 shown in FIG. 2.

The distribution apparatus 700 comprises a first means (702) for receiving light emitted from a light source, which in an aspect comprises the panel 106.

The distribution apparatus 700 also comprises a second means (704) for providing a matching transparency gradient that is aligned with the light source to evenly distribute the emitted light.

Thus, the distribution apparatus 700 provides a matching transparency gradient to provide for uniform light distribution.

The various aspects of this disclosure are provided to enable one of ordinary skill in the art to practice the present invention. Various modifications to aspects presented throughout this disclosure will be readily apparent to those skilled in the art, and the concepts disclosed herein may be extended to other applications. Thus, the claims are not intended to be limited to the various aspects of this disclosure, but are to be accorded the full scope consistent with the language of the claims. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

Accordingly, while aspects of a distribution panel with matching transparency gradient have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for uniform distribution of light emitted from a light source, the method comprising:
   receiving the light emitted from the light source on a panel; and
   disposing gradient optics having varying transparency on the panel, wherein the gradient optics align with the light source to evenly distribute the light.

2. The method of claim 1, wherein the gradient optics further align with a center line through the light source so that the panel provides increasing transparency as a distance from the center line increases.

3. The method of claim 2, wherein the gradient optics comprise concentric regions of material that are disposed on the panel so that at least one of panel thickness and material density decreases as the distance from the center line increases.

4. The method of claim 2, wherein the gradient optics comprise a coating that is disposed on the panel so that the panel provides increasing transparency as the distance from the center line increases.

5. The method of claim 2, wherein the gradient optics comprise surface texturing disposed on the panel so that the panel provides increasing transparency as the distance from the center line increases.

6. The method of claim 5, wherein the surface texturing comprises surface features that provide increasing transparency as the distance from the center line increases.

7. The method of claim 5, wherein the surface texturing comprises surface defects that provide increasing transparency as the distance from the center line increases.

8. The method of claim 1, wherein the panel comprises at least one material selected from a set of materials comprising acrylic, plastic, crystal, glass, and polymer materials.

9. The method of claim 1, wherein the light source comprises one or more light emitting diodes (LEDs) and the gradient optics provide one or more matching transparency gradients, respectively, wherein each matching transparency gradient aligns with a center line associated with a respective LED.

10. The method of claim 9, wherein the one or more LEDs are mounted in a troffer and the panel is sized to fit the troffer to provide uniform light distribution.

11. The method of claim 1, wherein the light source comprises a fluorescent tube and the gradient optics align with a center line located along the length of the fluorescent tube.

12. The method of claim 11, wherein the fluorescent tube is mounted in a troffer and the panel is sized to fit the troffer to provide uniform light distribution.

* * * * *